US009868574B2

(12) United States Patent
Ieda et al.

(10) Patent No.: US 9,868,574 B2
(45) Date of Patent: Jan. 16, 2018

(54) WATER-SOLUBLE PACKAGING FILM

(71) Applicant: SEKISUI CHEMICAL CO., LTD., Osaka (JP)

(72) Inventors: Yasuyuki Ieda, Aichi (JP); Shintaro Moriguchi, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/506,816

(22) PCT Filed: Aug. 27, 2015

(86) PCT No.: PCT/JP2015/074218

§ 371 (c)(1),
(2) Date: Feb. 27, 2017

(87) PCT Pub. No.: WO2016/035671

PCT Pub. Date: Mar. 10, 2016

(65) Prior Publication Data

US 2017/0247154 A1 Aug. 31, 2017

(30) Foreign Application Priority Data

Sep. 1, 2014 (JP) ................................ 2014-177522
Feb. 20, 2015 (JP) ................................ 2015-032186

(51) Int. Cl.

*B65D 65/46* (2006.01)
*C08J 5/18* (2006.01)
*C08K 3/10* (2006.01)
*C08K 5/053* (2006.01)

(52) U.S. Cl.

CPC ................ *B65D 65/46* (2013.01); *C08J 5/18* (2013.01); *C08K 3/10* (2013.01); *C08K 5/053* (2013.01); *C08J 2329/04* (2013.01)

(58) Field of Classification Search

CPC ......... B65D 65/46; C08J 5/18; C08J 2329/04; C08K 3/10; C08K 5/053
See application file for complete search history.

(56) References Cited

U.S. PATENT DOCUMENTS

2002/0182348 A1* 12/2002 Fujiwara ................ B29C 44/12 428/34.2
2005/0053792 A1 3/2005 Toyoshima et al.

FOREIGN PATENT DOCUMENTS

| | | |
|---|---|---|
| JP | 48-99752 | 12/1973 |
| JP | 50-71770 | 6/1975 |
| JP | 5-1198 | 1/1993 |
| JP | 9-272772 | 10/1997 |
| JP | 2001-322668 | 11/2001 |
| JP | 2003-171424 | 6/2003 |
| JP | 2003-171521 | 6/2003 |
| JP | 2005-179390 | 7/2005 |
| JP | 2006-257225 | 9/2006 |
| JP | 2011-195672 | 10/2011 |
| JP | 2013-518008 | 5/2013 |
| JP | 5781676 | 9/2015 |
| WO | 03/033548 | 4/2003 |
| WO | 2011-094472 | 8/2011 |

OTHER PUBLICATIONS

International Search Report dated Nov. 10, 2015 in International (PCT) Application No. PCT/JP2015/074218.

* cited by examiner

*Primary Examiner* — Michael C Miggins
(74) *Attorney, Agent, or Firm* — Wenderoth, Lind & Ponack, L.L.P.

(57) ABSTRACT

The present invention provides a water-soluble packaging film which is capable of packaging chemicals while maintaining appropriate flexibility without changes in the appearance or offensive odors over a long period of time, which takes much less time to dissolve in water, and which can achieve excellent water solubility, excellent visibility, and excellent chemical resistance. The present invention relates to a water-soluble packaging film containing: polyvinyl alcohol; a plasticizer; and an alkali metal, the water-soluble packaging film containing 3 to 15 parts by weight of the plasticizer based on 100 parts by weight of the polyvinyl alcohol, the water-soluble packaging film containing 0.3 to 5% by weight of the alkali metal based on 100% by weight of the water-soluble packaging film.

6 Claims, No Drawings

WATER-SOLUBLE PACKAGING FILM

TECHNICAL FIELD

The present invention relates to a water-soluble packaging film which is capable of packaging chemicals while maintaining appropriate flexibility without changes in the appearance or offensive odors over a long period of time, which takes much less time to dissolve in water, and which can achieve excellent water solubility, excellent visibility, and excellent chemical resistance.

BACKGROUND ART

Polyvinyl alcohol (hereafter, also referred to as PVA) has been widely used as a packaging material because it is excellent in transparency, oil resistance, chemical resistance, and gas barrier properties against oxygen or the like. PVA has been often used as a packaging material for food, pharmaceuticals, industrial chemicals, agrochemicals, and the like whose properties are greatly affected by deterioration due to oxidation.

In addition, PVA has been also used as a film or sheet for temporary protection of products and parts because of its high water solubility. PVA used as a film for temporary protection, such as surface protection during metalworking, protection during vulcanization of rubber parts, and surface protection of resin molded articles, can be easily removed by water, warm water, or hot water. This enables omission of a step of peeling and discarding the protective films.

However, the water solubility of PVA is problematically lowered when PVA is subjected to a heat history during the surface protection. For example, in metalworking, the protective film may be subjected to a heat history in the step of heat pressing or the like. In such a case, PVA may not be sufficiently removed due to the lowered water solubility.

To overcome the situation, Patent Literature 1 discloses a technique of improving the water solubility after the heat history by adding a hydrazine compound and a polybasic acid or an alkali metal salt thereof to a polyvinyl alcohol resin.

However, according to the technique of Patent Literature 1, the film disadvantageously exhibits poor processability upon packaging chemicals due to its low flexibility and has insufficient water solubility, especially resulting in a long dissolution time thereof.

In the case of a water-soluble film used for packaging agrochemicals, chemicals, or the like, PVA is modified with carboxyl groups or blended with a plasticizer for improvement of the properties as a water-soluble film. However, such a technique disadvantageously causes gradual discoloration of the film to light yellow due to a heat history upon film formation or contact with chemicals filled therein.

To overcome the situation, Patent Literature 2 discloses a water-soluble film prepared by adding a plasticizer and sulfite to a polyvinyl alcohol resin. Such a film suffers less coloring upon film formation or less coloring with time due to contact with chemicals.

However, addition of sulfite to a water-soluble film cannot shorten the dissolution time. In addition, sulfite may react with a weak acid to generate sulfur dioxide gas, which causes offensive odors from the water-soluble film.

CITATION LIST

Patent Literature

Patent Literature 1: JP 2003-171521 A
Patent Literature 2: JP 2005-179390 A

SUMMARY OF INVENTION

Technical Problem

The present invention aims to provide a water-soluble packaging film which is capable of packaging chemicals while maintaining appropriate flexibility without changes in the appearance or offensive odors over a long period of time, which takes much less time to dissolve in water, and which can achieve excellent water solubility, excellent visibility, and excellent chemical resistance.

Solution to Problem

The present invention relates to a water-soluble packaging film containing: polyvinyl alcohol; a plasticizer; and an alkali metal, the water-soluble packaging film containing 3 to 15 parts by weight of the plasticizer based on 100 parts by weight of the polyvinyl alcohol, the water-soluble packaging film containing 0.3 to 5% by weight of the alkali metal based on 100% by weight of the water-soluble packaging film.

The present invention is specifically described in the following.

The present inventors found out that adding a plasticizer and an alkali metal, as components of a water-soluble packaging film, in addition to polyvinyl alcohol and setting the amounts of the plasticizer and the alkali metal each within a predetermined range enables production of a water-soluble packaging film which is capable of packaging chemicals while maintaining appropriate flexibility without offensive odors over a long period of time, which takes much less time to dissolve in water, and which can achieve excellent water solubility, excellent visibility, and excellent chemical resistance. The present invention was thus completed.

Hereafter, each component used for a PVA aqueous solution according to the present invention is specifically described.

(Polyvinyl Alcohol (PVA))

The water-soluble packaging film of the present invention contains polyvinyl alcohol.

The polyvinyl alcohol is a main constituent material of the water-soluble packaging film of the present invention.

The polyvinyl alcohol is obtained by polymerizing a vinyl ester to prepare a polymer and saponifying, namely hydrolyzing the polymer in accordance with a conventionally known method. For saponification, an alkali or an acid is commonly used. Preferably, an alkali is used for saponification. As the polyvinyl alcohol, one type of polyvinyl alcohol may be used or two or more types of polyvinyl alcohols may be used in combination.

Examples of the vinyl ester include vinyl acetate, vinyl formate, vinyl propionate, vinyl butyrate, vinyl pivalate, vinyl versatate, vinyl laurate, vinyl stearate, and vinyl benzoate.

The vinyl ester may be polymerized by any method. Examples of the polymerization method include solution polymerization, bulk polymerization, and suspension polymerization.

Examples of a polymerization catalyst used in polymerization of the vinyl ester include 2-ethylhexyl peroxydicarbonate ("TrigonoxEHP" produced by Tianjin McEIT Co., ltd.), 2,2'-azobisisobutyronitrile (AIBN), t-butyl peroxyneodecanoate, bis(4-t-butylcyclohexyl) peroxydicarbonate, di-n-propyl peroxydicarbonate, di-n-butyl peroxydicarbonate, di-cetyl peroxydicarbonate, and di-sec-butyl peroxydicarbonate. These polymerization catalysts may be used alone, or in combination of two or more.

The polymer obtained by polymerizing the vinyl ester is preferably a polyvinyl ester because the saponification degree can be easily controlled within a preferable range. The polymer obtained by polymerizing the vinyl ester may be a copolymer of the vinyl ester and another monomer. The polyvinyl alcohol may be prepared from a copolymer of a vinyl ester and another monomer. Examples of the other monomer, namely, a co-monomer to be copolymerized, include olefins, (meth)acrylic acid and salts thereof, (meth) acrylates, (meth)acrylamide derivatives, N-vinyl amides, vinyl ethers, nitriles, vinyl halides, allyl compounds, maleic acid and salts thereof, maleates, itaconic acid and salts thereof, itaconates, vinylsilyl compounds, and isopropenyl acetate. The other monomers may be used alone, or in combination of two or more.

Examples of the olefins include ethylene, propylene, 1-butene, and isobutene. Examples of the (meth)acrylates include methyl (meth)acrylate, ethyl (meth)acrylate, n-propyl (meth)acrylate, i-propyl (meth)acrylate, n-butyl (meth) acrylate, and 2-ethylhexyl (meth)acrylate. Examples of the (meth)acrylamide derivatives include acrylamide, n-methylacrylamide, N-ethylacrylamide, N,N-dimethylacrylamide, and (meth)acrylamidepropanesulfonic acid and salts thereof. Examples of the N-vinyl amides include N-vinylpyrrolidone. Examples of the vinyl ethers include methyl vinyl ether, ethyl vinyl ether, n-propyl vinyl ether, i-propyl vinyl ether, and n-butyl vinyl ether. Examples of the nitriles include (meth)acrylonitrile. Examples of the vinyl halides include vinyl chloride and vinylidene chloride. Examples of the allyl compounds include allyl acetate and allyl chloride. Examples of the vinylsilyl compounds include vinyltrimethoxysilane.

In the case where the polyvinyl alcohol and the other monomer are copolymerized to prepare a modified PVA, the modification amount is preferably 15 mol % or lower, more preferably 5 mol % or lower. In other words, in 100 mol % of the total of a structural unit derived from a vinyl ester and a structural unit derived from the other monomer in the modified PVA, the structural unit derived from the vinyl ester preferably constitutes 85 mol % or more, more preferably 95 mol % or more, and the structural unit derived from the other monomer preferably constitutes 15 mol % or less, more preferably 5 mol % or less. As used herein, the polyvinyl alcohol includes modified polyvinyl alcohol (modified PVA).

The modified PVA is preferably prepared by modification with a hydrophilic group.

The hydrophilic group is preferably at least one selected from the group consisting of a sulfonic acid group, a pyrrolidone ring group, an amino group, and a carboxyl group. In particular, more preferred are a sulfonic acid group and a pyrrolidone ring group. The hydrophilic group includes metal salts of hydrophilic groups, in addition to the above functional groups. Examples of the metal salts include alkali metals such as sodium, potassium, and lithium.

The modified PVA prepared through modification with the hydrophilic group include, in addition to those obtained by copolymerizing an unmodified polyvinyl alcohol and another monomer having the hydrophilic group, those obtained by adding a hydrophilic group to an unmodified polyvinyl alcohol.

Examples of the modified PVA include sulfonic acid group-modified polyvinyl alcohol, pyrrolidone ring-modified polyvinyl alcohol, amino group-modified polyvinyl alcohol, and carboxyl group-modified polyvinyl alcohol.

The sulfonic acid group-modified polyvinyl alcohol is not particularly limited as long as a sulfonic acid group is introduced by modification, and is preferably one in which a sulfonic acid group is bonded to a polymer main chain through a linking group.

Examples of the linking group include an amide group, an alkylene group, an ester group, and an ether group. In particular, a combination of an amide group and an alkylene group is preferred.

The sulfonic acid group is preferably a sulfonate group, particularly preferably a sodium sulfonate group.

Especially, when the modified PVA is a sodium sulfonate-modified polyvinyl alcohol, sodium sulfonate-modified polyvinyl alcohol preferably has a structure unit represented by the following formula (1):

(1)

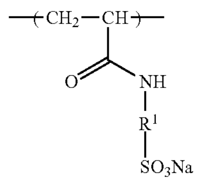

wherein $R^1$ represents a C1-C4 alkylene group.

When the modified PVA is a pyrrolidone ring-modified polyvinyl alcohol, the pyrrolidone ring-modified polyvinyl alcohol preferably has a structure unit represented by the following formula (2):

(2)

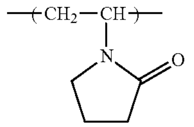

When the modified PVA is an amino group-modified polyvinyl alcohol, the amino group-modified polyvinyl alcohol preferably has a structure unit represented by the following formula (3):

(3)

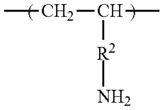

wherein $R^2$ represents a single bond or a C1-C10 alkylene group.

When the modified PVA is a carboxyl group-modified polyvinyl alcohol, the carboxyl group-modified polyvinyl alcohol preferably has a structure unit represented by the following formula (4-1), (4-2), or (4-3):

(4-1)

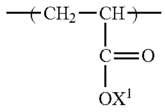

(4-2)

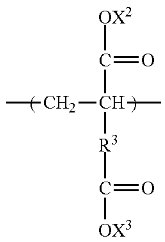

(4-3)

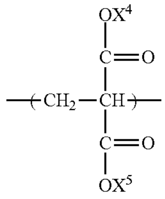

wherein $X^1$, $X^2$, $X^3$, $X^4$, and $X^5$ each independently represent a hydrogen atom, a metal atom, or a methyl group. In other words, the carboxyl group included in the structure unit having a carboxyl group as used herein includes salts and methyl esters of carboxyl groups. Examples of the metal atom include sodium atom.

In the formula (4-2), $R^3$ represents a C1-C10 alkylene group.

Exemplary commercial products of the modified PVA include "KL-318", "KL-118", "KM-618", and "KM-118" (all produced by Kuraray Co., Ltd.).

Regarding the amount of the structure unit having a hydrophilic group in the modified PVA, the lower limit is preferably 0.1 mol %, more preferably 0.2 mol %, still more preferably 0.5 mol %, particularly preferably 1 mol %, and the upper limit is preferably 15 mol %, more preferably 10 mol %, still more preferably 8 mol %. When the amount of the structure unit having a hydrophilic group satisfies the above lower limit and the upper limit, the film obtained is resistant to chlorine-containing sanitary agents or oxidizing chemicals, namely, not colored or torn by such agents or chemicals over a long period of time.

Regarding the saponification degree of the polyvinyl alcohol, the lower limit is preferably 80 mol %, more preferably 85 mol %, still more preferably 88 mol %, particularly preferably 90 mol %, further particularly preferably 92 mol %, and the upper limit is preferably 99.9 mol %, more preferably 99.0 mol %, still more preferably 98 mol %, particularly preferably 97 mol %, further particularly preferably 96 mol %. When the saponification degree satisfies the above lower limit and the upper limit, the water resistance of the water-soluble packaging film and the dissolution time thereof upon release of chemicals are easily controlled. From the standpoint of improving the water resistance and facilitating the control of the dissolution time in a balanced manner, the saponification degree of the PVA is particularly preferably 85 mol % or higher and 96 mol % or lower.

The saponification degree is measured in conformity with JIS K6726. The saponification degree indicates the proportion of units actually saponified to vinyl alcohol units among units to be converted to vinyl alcohol units by saponification.

The saponification degree may be adjusted by any method. The saponification degree can be appropriately adjusted by saponification conditions, namely, hydrolysis conditions.

The PVA has a standard deviation ($\sigma$) of the saponification degree distribution of preferably 0.1 to 1.0 mol %.

When the standard deviation of the saponification degree distribution satisfies the above lower limit and the upper limit, the solubility and the chemical resistance of the water-soluble packaging film are enhanced, and both the dissolution time upon release of chemicals and the storage period when packaging chemicals therein are improved in a balanced manner. Regarding the standard deviation of the saponification degree distribution of the PVA, the lower limit is more preferably 0.2 mol % and the upper limit is more preferably 0.9 mol %.

The standard deviation of the saponification degree distribution is an index showing variations of the saponification degree in PVA, and can be calculated based on the measurement by FT-IR or the like.

The PVA may have any polymerization degree. The lower limit of the polymerization degree of the PVA is preferably 400, more preferably 500, still more preferably 600, particularly preferably 900, and the upper limit thereof is preferably 2000, more preferably 1800, still more preferably 1500. When the polymerization degree satisfies the above lower limit and the upper limit, an aqueous solution thereof has an appropriate viscosity for formation of a water-soluble packaging film. When the polymerization degree satisfies the above upper limit, the water-soluble packaging film has better strength to have water resistance. The polymerization degree is measured in conformity with JIS K6726.

Regarding the viscosity of a 4% by weight aqueous solution of the PVA measured at 20° C., the lower limit is preferably 3 mPa·s and the upper limit thereof is preferably 35 mPa·s. More preferably, the lower limit is 5 mPa·s and the upper limit is 30 mPa·s. When the viscosity is 3 mPa·s or higher, the water resistance can be improved. When the viscosity is 35 mPa·s or lower, the dissolution time can be shortened. The lower limit of the viscosity is more preferably 8 mPa·s and the upper limit is more preferably 20 mPa·s.

The viscosity can be measured in conformity with JIS K6726.

In 100% by weight of the water-soluble packaging film of the present invention, the lower limit of the polyvinyl alcohol content is preferably 70% by weight and the upper limit thereof is preferably 97% by weight.

When the polyvinyl alcohol content satisfies the above lower limit, the water-soluble packaging film may be a better-quality film without bleeding of a plasticizer therefrom. When the polyvinyl alcohol content satisfies the above upper limit, the water-soluble packaging film may have further better strength to have water resistance.

(Alkali Metal)

The water-soluble packaging film of the present invention contains an alkali metal.

Containing the alkali metal, the water-soluble packaging film allows control of the dissolution time thereof while maintaining the water resistance.

The water-soluble packaging film of the present invention may be allowed to contain an alkali metal by any method. Examples of the method for allowing the film to contain the alkali metal include addition of an alkali metal salt and the use of polyvinyl alcohol containing an alkali metal.

Examples of the polyvinyl alcohol containing an alkali metal include a modified PVA prepared by modification with a hydrophilic group having an alkali metal salt.

For example, in the case of using a modified PVA prepared by using a large amount of an alkali metal in the modification step, addition of the modified PVA can allow the film to contain an alkali metal.

In 100% by weight of the water-soluble packaging film of the present invention, the alkali metal content is 0.3 to 5% by weight.

When the alkali metal content is less than 0.3% by weight, the effect of shortening the dissolution time may not be exerted. When the alkali metal content is more than 5% by weight, the alkali metal may bleed out of the water-soluble packaging film to damage the appearance of the water-soluble packaging film.

The lower limit of the alkali metal content is preferably 0.5% by weight, and the upper limit thereof is preferably 4.5% by weight.

The alkali metal content can be measured with, for example, an ICP emission analyzer.

The water-soluble packaging film of the present invention has an alkali metal content per unit area of preferably 0.06 to 10 $g/m^2$. When the alkali metal content per unit area is 0.06 $g/m^2$ or more, the effect of shortening the dissolution time can be achieved. When the alkali metal content per unit area is $g/m^2$ or less, bleeding of the alkali metal from the water-soluble packaging film can be prevented.

The alkali metal content per unit area refers to the weight of the alkali metal relative to the area of the main surface of the water-soluble packaging film.

Such an alkali metal content per unit area can be calculated based on the amount of the alkali metal measured with an ICP emission analyzer and the area of the main surface of the water-soluble packaging film.

Li, Na, K, Rb, and Cs can be used as the alkali metal. In particular, the alkali metal is preferably Na or K. The alkali metal is preferably derived from an alkali metal salt. Alternatively, the alkali metal may be derived from an alkali metal of the polyvinyl alcohol or the plasticizer used.

Examples of the alkali metal salt include hydrides, halides, oxygenates, sulfides, oxoates, and organic acid salts of the alkali metals.

Examples of organic acids constituting the organic acid salts include formic acid, acetic acid, lactic acid, succinic acid, gluconic acid, maleic acid, chloroacetic acid, oxalic acid, glycolic acid, tartaric acid, and citric acid.

Examples of the alkali metal salts in the case of the most common alkali metal, Na, include halides such as NaF, NaCl, NaBr, and NaI, oxygenates such as $Na_2O$, NaOH, $Na_2O_2$, and $NaO_2$, sulfides such as $Na_2S.nH_2O$ and $NaHS.nH_2O$, chlorinated compounds such as NaClO, $NaClO_2$, $NaClO_3$, and $NaClO_4$, phosphorus compounds such as $NaPH_2O_2$, $Na_2PHO_3$, $Na_4P_2O_6$, $Na_2H_2P_2O_6$, and $Na_3PO_4$, and organic acid salts such as $NaHCO_2$, $NaCH_3CO_2$, $Na_2C_2O_4$, $Na_2C_4H_4O_6$, and $Na_3C_6H_5O_7$. Preferred among these are sodium formate ($NaHCO_2$) and sodium acetate ($NaCH_3CO_2$). Alternatively, the alkali metal salts in which Na is replaced by another alkali metal such as K or Li may also be used.

These alkali metal salts may be used alone, or in combination of two or more.

The lower limit of the molecular weight of the alkali metal salt is preferably 50, and the upper limit thereof is preferably 140. When the molecular weight is less than 50, such an alkali metal salt vigorously reacts with water and thus has poor handleability. When the molecular weight is more than 140, the effect of shortening the dissolution time may not be exerted. The lower limit of the molecular weight is more preferably 60, and the upper limit thereof is more preferably 100.

The amount added of the alkali metal salt in the case of adding the alkali metal salt is preferably 0.5 to 15 parts by weight based on 100 parts by weight of the polyvinyl alcohol. When the amount added of the alkali metal salt is less than 0.5 parts by weight, the effect of shortening the dissolution time may not be exerted. When the amount is more than 15 parts by weight, the alkali metal salt may bleed out from the water-soluble packaging film to damage the appearance of the film.

(Plasticizer)

The water-soluble packaging film of the present invention contains a plasticizer.

The water-soluble packaging film is required to have high tensile strength and high durability because it may be conveyed, stored, or used in hot and humid regions or cold regions. Especially, impact resistance at low temperatures is considered to be important. Containing a plasticizer, the water-soluble packaging film of the present invention can have a lower glass transition point, which improves the durability of the film at low temperatures. Containing the plasticizer, the water-soluble packaging film can also have better solubility in water.

The plasticizer may be any plasticizer commonly used as a plasticizer for PVA. Examples thereof include: polyhydric alcohols such as glycerin, diglycerin, diethylene glycol, trimethylolpropane, triethylene glycol, dipropylene glycol, and propylene glycol; polyethers such as polyethylene glycol and polypropylene glycol; phenol derivatives such as bisphenol A and bisphenol S; amide compounds such as N-methylpyrrolidone; compounds prepared by adding ethylene oxide to polyhydric alcohols such as glycerin, pentaerythritol, and sorbitol; and water. These may be used alone, or in combination of two or more.

Among the above plasticizers, preferred are glycerin, trimethylolpropane, polyethylene glycol, polypropylene glycol, triethylene glycol, dipropylene glycol, and propylene glycol because water solubility can be improved. Since the water solubility is markedly improved, particularly preferred are glycerin and trimethylolpropane.

The water-soluble packaging film of the present invention contains 3 to 15 parts by weight of the plasticizer based on 100 parts by weight of the polyvinyl alcohol. When the amount of the plasticizer is less than 3 parts by weight, the effect of adding the plasticizer is not achieved. In contrast, when the amount of the plasticizer is more than 15 parts by weight, bleeding of the plasticizer becomes larger, lowering the anti-blocking properties of the water-soluble packaging film to be obtained.

The lower limit of the amount of the plasticizer is preferably 3.2 parts by weight, and the upper limit thereof is preferably 13 parts by weight.

The upper limit of the thickness of the water-soluble packaging film of the present invention is preferably 100 μm, more preferably 80 μm, still more preferably 75 μm. The lower limit of the thickness of the water-soluble packaging film of the present invention is preferably 10 μm. When the thickness of the water-soluble packaging film satisfies the lower limit, the film for packaging chemicals has still higher strength. When the thickness of the water-soluble packaging film satisfies the upper limit, the water-soluble packaging film has still higher packaging properties or heat sealing properties. Moreover, the processing time is further shortened to further improve the productivity.

The water-soluble packaging film of the present invention may further appropriately contain common additives such as colorants, flavoring agents, bulking agents, defoamers, releasing agents, ultraviolet absorbers, surfactants, and starch, if needed. Particularly, for the purpose of improving the releasability between the metal surface of a die or a drum of a film forming machine and a formed film or a stock solution of a film, the amount added of the surfactant is preferably 0.01 to 5 parts by weight based on 100 parts by weight of PVA.

The water-soluble packaging film of the present invention preferably has a tensile strength of 5 to 30 MPa at an elongation of 100% in a tensile test. When the tensile strength is lower than 5 MPa, the strength of the film wrapping chemicals therein may be lowered, so that the film fails to maintain its shape as a package. When the tensile strength is more than 30 MPa, the dissolution time may become longer. The tensile strength is more preferably 6 MPa or higher, still more preferably 8 MPa or higher, and is more preferably 25 MPa or lower, still more preferably 23 MPa or lower.

The water-soluble packaging film of the present invention can provide a film resistant to chlorine-containing sanitary agents or oxidizing chemicals, namely, not colored or torn by such chemicals over a long period of time.

The chlorine-containing sanitary agent may be at least one selected from calcium hypochlorite, dichloroisocyanuric acid, trichloroisocyanuric acid, and salts and hydrates of these. Preferably, trichloroisocyanuric acid, its salt, or its hydrate is contained in a unit dose package. The chlorine-containing sanitary agents may be in any appropriate form, such as granules, powder, liquid, gel, or tablets. The oxidizing chemical may be selected from hypochlorites, chlorinated and/or brominated isocyanurates, chlorates, perchlorates, bromates, perbromates, perborates, periodates, persulfates, permanganates, chromates, dichromates, nitrates, nitrites, peroxides, ketone peroxides, peroxy acids, inorganic acids, and combinations of these.

(Production Method of Water-Soluble Packaging Film)

The water-soluble packaging film of the present invention may be produced by any method, and is produced by, for example, casting a PVA aqueous solution containing PVA, a plasticizer, an alkali metal salt, and water on a support member and drying the casted solution. Specific examples of the production method include solution casting, roll coating, spin coating, screen coating, fountain coating, dipping, and spraying.

The PVA aqueous solution contains water together with the PVA and the plasticizer. The PVA is mainly dissolved in the water.

In the PVA aqueous solution, the water content based on 100 parts by weight of the components (including the PVA) other than water is 300 parts by weight or more, preferably 400 parts by weight or more, more preferably 500 parts by weight or more.

The water content is 900 parts by weight or less, preferably 800 parts by weight or less, more preferably 700 parts by weight or less. When the water content satisfies the lower limit, the viscosity of the PVA aqueous solution is appropriately low. In such a case, casting of the PVA aqueous solution is facilitated. When the water content satisfies the upper limit, the viscosity of the PVA aqueous solution is appropriately high. In such a case, casting of the PVA aqueous solution is facilitated, the drying time is further shortened, and the productivity is further improved, resulting in production of a higher-quality water-soluble packaging film in which the orientation of the water-soluble packaging film is further improved.

The support member is preferably capable of keeping the PVA aqueous solution on its surface upon casting of the PVA aqueous solution and supporting a water-soluble packaging film to be obtained. The support member is made of, for example, a polyolefin, a polyester, an acrylic resin, or the like. Alternatively, the support member may be made of a material other than the above materials. Examples of the polyolefin include polyethylene, polypropylene, ethylene-vinyl acetate copolymers, and ethylene-vinyl alcohol copolymers. Examples of the polyester include polyethylene terephthalate and polyethylene naphthalate. The support member is preferably not made of PVA.

The PVA aqueous solution casted on the support member may be dried by any appropriate method. Examples of the drying method include natural drying and drying with heat at a temperature not higher than the glass transition temperature of PVA.

The water-soluble packaging film of the present invention may be a laminated film including a support member and a water-soluble packaging film laminated on the support member. The laminated film can be produced by casting the above-described PVA aqueous solution and drying the solution. As above, the water-soluble packaging film may be provided in a state of being laminated on a support member.

The water-soluble packaging film may be used, for example, as a film for packaging chemicals such as detergents, agrochemicals, or pharmaceuticals.

Advantageous Effects of Invention

The present invention can provide a water-soluble packaging film which is capable of packaging chemicals while maintaining appropriate flexibility without offensive odors over a long period of time, which takes much less time to dissolve in water, and which can achieve excellent water solubility, excellent visibility, and excellent chemical resistance.

DESCRIPTION OF EMBODIMENTS

Embodiments of the present invention are further specifically described in the following with reference to, but not limited to, examples.

Example 1

An amount of 92.8 parts by weight of polyvinyl alcohol (produced by Sekisui Specialty Chemicals, Selvol513, polymerization degree: 1300, saponification degree: 88.0 mol %, viscosity of 4% by weight aqueous solution: 14 mPa·s, standard deviation of saponification degree distribution: 0.18 mol %), 3.2 parts by weight of glycerin (Wako Pure Chemical Industries, Ltd.) and 1.6 parts by weight of trimethylolpropane (Wako Pure Chemical Industries, Ltd.) as plasticizers, and 2.4 parts by weight of sodium acetate (Wako Pure Chemical Industries, Ltd.) were dissolved in 600 parts by weight of water to prepare a 14.3% by weight aqueous solution.

The standard deviation of the saponification degree distribution of the polyvinyl alcohol was measured as follows.

(Measurement of Standard Deviation of Saponification Degree Distribution)

Forty polyvinyl alcohol particles were randomly selected, and the acetyl group content of the polyvinyl alcohol was measured with a FT-IR spectrophotometer (produced by Shimadzu Corporation, IRAffinity-1) by ATR method. Based on the measured acetyl group content, the saponification degree of each particle was determined. Based on variations of the obtained saponification degrees, the standard deviation (σ) of the saponification degree distribution was calculated.

The obtained PVA aqueous solution was applied to a polyethylene terephthalate (PET) film (thickness: 50 μm) as a support member with an auto film applicator (produced by Tester Sangyo Co., Ltd., "PI-1210"), and dried at 80° C. for 5 minutes and then at 100° C. for 20 minutes to give a laminated film including a PVA film (thickness: 50 μm) on a support member.

Examples 2 to 3

Laminated films including a PVA film (thickness: 50 μm) were prepared in the same manner as in Example 1, except that polyvinyl alcohol, glycerin, trimethylolpropane, and sodium acetate were added each in an amount shown in Table 1.

Example 4

An amount of 94 parts by weight of sodium sulfonate-modified polyvinyl alcohol (polymerization degree: 1200, $R^1$=$C_4H_8$, saponification degree: 95.4 mol %, modification amount with sodium sulfonate: 4 mol %, viscosity of 4% by weight aqueous solution: 12 mPa·s, standard deviation of saponification degree distribution: 0.31 mol %) having a structure represented by the formula (1), 3 parts by weight of glycerin (Wako Pure Chemical Industries, Ltd.) and 3 parts by weight of trimethylolpropane (Wako Pure Chemical Industries, Ltd.) as plasticizers were dissolved in 600 parts by weight of water to prepare a 14.3% by weight aqueous solution.

Using the obtained PVA aqueous solution, a laminated film including a PVA film (thickness: 50 μm) laminated on a support member was produced in the same manner as in Example 1.

Example 5

A laminated film including a PVA film (thickness: 50 μm) was produced in the same manner as in Example 4, except that polyvinyl alcohol (sodium sulfonate-modified polyvinyl alcohol), glycerin, trimethylolpropane, and sodium acetate were added each in an amount as shown in Table 1.

Example 6

An amount of 89 parts by weight of pyrrolidone ring-modified polyvinyl alcohol (polymerization degree: 1000, saponification degree: 95.8 mol %, modification amount with pyrrolidone: 4 mol %, viscosity of 4% by weight aqueous solution: 10 mPa·s, standard deviation of saponification degree distribution: 0.21 mol %) having a structure represented by the formula (2), 5.0 parts by weight of glycerin (Wako Pure Chemical Industries, Ltd.) and 5.0 parts by weight of trimethylolpropane (Wako Pure Chemical Industries, Ltd.) as plasticizers, and 1 part by weight of sodium acetate (Wako Pure Chemical Industries, Ltd.) were dissolved in 600 parts by weight of water to prepare a 14.3% by weight aqueous solution.

Using the obtained PVA aqueous solution, a laminated film including a PVA film (thickness: 50 μm) laminated on a support member was produced in the same manner as in Example 1.

Example 7

An amount of 94 parts by weight of sodium sulfonate-modified polyvinyl alcohol (polymerization degree: 1200, $R^1$=$CH_2$, saponification degree: 90.1 mol %, modification amount with sodium sulfonate: 4 mol %, standard deviation of saponification degree distribution: 0.98 mol %) as polyvinyl alcohol, 3 parts by weight of glycerin (Wako Pure Chemical Industries, Ltd.) and 3 parts by weight of trimethylolpropane (Wako Pure Chemical Industries, Ltd.) as plasticizers were dissolved in 600 parts by weight of water to prepare a 14.3% by weight aqueous solution.

The obtained PVA aqueous solution was applied to a polyethylene terephthalate (PET) film (thickness: 50 μm) as a support member with an auto film applicator (produced by Tester Sangyo Co., Ltd., "PI-1210"), and dried at 80° C. for 5 minutes and then at 100° C. for 20 minutes to produce a PVA film (thickness: 50 μm) on the support member.

After removal of the support member from the obtained PVA film, the PVA film was exposed to an environment at a temperature of 23° C. and a relative humidity of 50% RH for 24 hours, thereby obtaining a water-soluble packaging film.

Example 8

A water-soluble packaging film was produced in the same manner as in Example 7, except that sodium sulfonate-modified polyvinyl alcohol was changed to amino group-modified polyvinyl alcohol (polymerization degree: 600, $R^2$=$CH_2$, saponification degree: 91.8 mol %, modification amount with amino group: 8 mol %, standard deviation of saponification degree distribution: 0.28 mol %) having a structure represented by the formula (3).

Example 9

A water-soluble packaging film was produced in the same manner as in Example 7, except that sodium sulfonate-modified polyvinyl alcohol was changed to carboxylic acid-modified polyvinyl alcohol A (polymerization degree: 1700, $R^3$=$CH_2$, $X^2$ and $X^3$=sodium atoms, saponification degree: 97.5 mol %, modification amount with carboxyl group: 1.5 mol %, standard deviation of saponification degree distribution: 0.12%) having a structure represented by the formula (4-2).

Example 10

A water-soluble packaging film was prepared in the same manner as in example 7, except that sodium sulfonate-modified polyvinyl alcohol was changed to carboxylic acid-modified polyvinyl alcohol B (polymerization degree: 1700, $R^3$=$CH_2$, $X^2$ and $X^3$=sodium atoms, saponification degree: 98.2 mol %, modification amount with carboxyl group: 0.5 mol %, standard deviation of saponification degree distribution: 0.25%) having a structure represented by the formula (4-2).

Example 11

An amount of 89 parts by weight of pyrrolidone ring-modified polyvinyl alcohol (polymerization degree: 1000, saponification degree: 95.8 mol %, modification amount with pyrrolidone: 4 mol %, viscosity of 4% by weight aqueous solution: 10 mPa·s, standard deviation of saponification degree distribution: 0.21 mol %) having a structure represented by the formula (2), 3.0 parts by weight of glycerin (Wako Pure Chemical Industries, Ltd.) and 3.0 parts by weight of trimethylolpropane (Wako Pure Chemical Industries, Ltd.) as plasticizers, and 5.0 parts by weight of potassium acetate (Wako Pure Chemical Industries, Ltd.) were dissolved in 600 parts by weight of water to prepare a 14.3% by weight aqueous solution.

Using the obtained PVA aqueous solution, a laminated film including a PVA film (thickness: 50 μm) laminated on a support member was produced in the same manner as in Example 1.

Example 12

An amount of 86 parts by weight of pyrrolidone ring-modified polyvinyl alcohol (polymerization degree: 1000, saponification degree: 95.8 mol %, modification degree with pyrrolidone: 4 mol %, viscosity of 4% by weight aqueous solution: 10 mPa·s, standard deviation of saponification degree distribution: 0.21 mol %) having a structure represented by the formula (2), 3.0 parts by weight of glycerin (Wako Pure Chemical Industries, Ltd.) and 2.0 parts by weight of trimethylolpropane (Wako Pure Chemical Industries, Ltd.) as plasticizers, and 9.0 parts by weight of lithium acetate (Wako Pure Chemical Industries, Ltd.) were dissolved in 600 parts by weight of water to prepare a 14.3% by weight aqueous solution.

Using the obtained PVA aqueous solution, a laminated film including a PVA film (thickness: 50 μm) on a support member was produced.

Comparative Examples 1 to 3

Laminated films including a PVA film (thickness: 50 μm) were produced in the same manner as in Example 1, except that polyvinyl alcohol, glycerin, trimethylolpropane, and sodium acetate were added each in an amount as shown in Table 1.

Comparative Example 4

A laminated film including a PVA film (thickness: 50 μm) was produced in the same manner as in Example 1, except that polyvinyl alcohol, glycerin, trimethylolpropane, sodium sulfite (Wako Pure Chemical Industries, Ltd.) were added each in an amount as shown in Table 1.

TABLE 1

| | Composition Polyvinyl alcohol resin | | | | | | |
|---|---|---|---|---|---|---|---|
| | Polymerization degree | Saponification degree (mol %) | Standard deviation of distribution of Saponification degree σ(mol) | Modifying group | Amount of modifying group (mol %) | Viscosity (mPa · s) | Amount added (parts by weight) |
| Example 1 | 1300 | 88 | 0.18 | — | — | 14 | 92.8 |
| Example 2 | 1300 | 88 | 0.18 | — | — | 14 | 88.1 |
| Example 3 | 1300 | 88 | 0.18 | — | — | 14 | 83.8 |
| Example 4 | 1200 | 95.4 | 0.31 | Sulfonic acid group | 4 | 12 | 94 |
| Example 5 | 1200 | 95.4 | 0.31 | Sulfonic acid group | 4 | 12 | 89 |
| Example 6 | 1000 | 95.8 | 0.21 | Pyrrolidone ring group | 4 | 10 | 89 |
| Example 7 | 1200 | 90.1 | 0.98 | Sulfonic acid group | 4 | 11 | 94 |
| Example 8 | 600 | 91.8 | 0.28 | Amino group | 8 | 6 | 94 |
| Example 9 | 1700 | 97.5 | 0.12 | Craboxyl group | 1.5 | 31 | 94 |
| Example 10 | 1700 | 98.2 | 0.25 | Craboxyl group | 0.5 | 30 | 94 |
| Example 11 | 1000 | 95.8 | 0.21 | Pyrrolidone ring group | 4 | 10 | 89 |
| Example 12 | 1000 | 95.8 | 0.21 | Pyrrolidone ring group | 4 | 10 | 86 |
| Comparative Example 1 | 1300 | 88 | 0.18 | — | — | 14 | 95.1 |
| Comparative Example 2 | 1300 | 88 | 0.18 | — | — | 14 | 80 |
| Comparative Example 3 | 1300 | 88 | 0.18 | — | — | 14 | 72.7 |
| Comparative Example 4 | 1300 | 88 | 0.18 | — | — | 14 | 94.0 |

| | Composition | | | | | | |
|---|---|---|---|---|---|---|---|
| | Plasticizer (parts by weight) | | Plasticizer content* (parts by weight) | Metal salt (parts by weight) | | | |
| | Glycerin | Trimethylolpropane | | Sodium acetate | Sodium sulfite | Potassium acetate | Lithium acetate |
| Example 1 | 3.2 | 1.6 | 5.2 | 2.4 | 0 | 0 | 0 |
| Example 2 | 3.1 | 1.4 | 5.1 | 7.4 | 0 | 0 | 0 |
| Example 3 | 2.9 | 1.4 | 5.1 | 11.9 | 0 | 0 | 0 |
| Example 4 | 3 | 3 | 6.4 | 0 | 0 | 0 | 0 |
| Example 5 | 1.5 | 1.5 | 3.4 | 8 | 0 | 0 | 0 |
| Example 6 | 5 | 5 | 11.2 | 1 | 0 | 0 | 0 |
| Example 7 | 3 | 3 | 6.4 | 0 | 0 | 0 | 0 |
| Example 8 | 3 | 3 | 6.4 | 0 | 0 | 0 | 0 |

TABLE 1-continued

| | | | | | | | |
|---|---|---|---|---|---|---|---|
| Example 9 | 3 | 3 | 6.4 | 0 | 0 | 0 | 0 |
| Example 10 | 3 | 3 | 6.4 | 0 | 0 | 0 | 0 |
| Example 11 | 3 | 3 | 6.7 | 0 | 0 | 5 | 0 |
| Example 12 | 3 | 2 | 5.8 | 0 | 0 | 0 | 9 |
| Comparative Example 1 | 3.3 | 1.6 | 5.2 | 0 | 0 | 0 | 0 |
| Comparative Example 2 | 10 | 10 | 25.0 | 0 | 0 | 0 | 0 |
| Comparative Example 3 | 2.3 | 1 | 4.5 | 24 | 0 | 0 | 0 |
| Comparative Example 4 | 3.3 | 1.7 | 5.3 | 0 | 0.5 | 0 | 0 |

*Amount added based on 100 parts by weight of polyvinyl alcohol resin (Evaluation)

(1) Measurement of Alkali Metal (Sodium, Potassium, Lithium) Content

The support member was peeled off from the obtained laminated film to prepare a water-soluble packaging film (200 mm×200 mm). The obtained water-soluble packaging film was exposed to an environment at a temperature of 23° C. and a relative humidity of 50% RH for 24 hours.

Then, the alkali metal (sodium, potassium, lithium) content (% by weight) based on 100% by weight of the water-soluble packaging film was measured with an ICP-MS (Hitachi High-Technologies Corporation, Z2310).

The alkali metal content (g/$m^2$) per unit area was also calculated.

(2) Tensile Strength

The support member was peeled off from the obtained laminated film to prepare a water-soluble packaging film. The obtained water-soluble packaging film was exposed to an environment at a temperature of 23° C. and a relative humidity of 50% RH for 24 hours.

Then, the water-soluble packaging film was cut to a size of 100 mm×15 mm, and the resulting film piece was subjected to a tensile test under the conditions of a temperature of 23° C., a humidity of 50%, and a peeling rate of 100 mm/min, thereby determining the tensile strength (Mpa) at an elongation of 100%.

○○ (Excellent): 5 MPa or higher but lower than 15 MPa.

○ (Good): 15 MPa or higher but lower than 30 MPa.

× (Poor): Lower than 5 MPa, or, 30 MPa or higher.

(3) Water Solubility (Dissolution Time)

The support member was peeled off from the obtained laminated film to prepare a water-soluble packaging film. The obtained water-soluble packaging film was exposed to an environment at a temperature of 23° C. and a relative humidity of 50% RH for 24 hours.

Then, the water-soluble packaging film was cut to a size of 35 mm×40 mm, and the obtained film piece was fixed to a jig. The film fixed to the jig was immersed in water (500 ml) in a 500-ml beaker under stirring (in such a manner that the bottom of a vortex reaches the metering line of 400 ml) with a stirrer while the water temperature was maintained at 23° C. The time until residues of the film was not any more observed visually on the jig was measured.

○○ (Excellent): Shorter than 20 seconds.

○ (Good): Shorter than 30 seconds.

× (Poor): 30 seconds or longer.

(4) Long-Term Storability

The support member was peeled off from the obtained laminated film to prepare a water-soluble packaging film. The obtained packaging film was put into an aluminum zipper bag and left to stand in an environment at a temperature of 23° C. and a relative humidity of 50% RH for a month.

Then, the water-soluble packaging film was taken out and visually observed to check the presence of bleeding of the plasticizer or the additives from the film after the standing for a month.

[Evaluation Criteria of Appearance]

○ (Good): Film was transparent and had no bleeding therefrom.

× (Poor): Film was turbid and had bleeding therefrom.

(5) Chemical Resistance

The obtained water-soluble packaging film was formed into a bag in a size of 5 cm×4 cm and allowed to contain 20 g of sodium trichloroisocyanurate therein. The package was further put into an aluminum bag and sealed therein. The bag was left in a constant temperature/humidity oven at a temperature of 40° C. and a humidity of 70% RH for a month. Then, the appearance of the water-soluble packaging film was visually observed.

○ (Good): The appearance was not changed.

× (poor): The appearance was colored yellow or brown.

(6) Visibility

The haze of the obtained water-soluble packaging film was measured with a haze meter (produced by Tokyo Denshoku Co., Ltd. TC-H3DPK) at 20° C., and evaluated based on the following criteria.

○ (Good): Haze of less than 3.5%.

× (Poor): Haze of 3.5% or more.

(7) Visibility after Durability Test

The obtained water-soluble packaging film was formed into a bag in a size of 5 cm×4 cm and allowed to contain 20 g of sodium trichloroisocyanurate therein. The bag was further put into an aluminum bag and sealed therein. The obtained bag was left in a constant temperature/humidity oven at a temperature of 40° C. and a humidity of 70% RH for a month. Then, the film portion was cut out from the bag, and the haze thereof was measured with a haze meter (produced by Tokyo Denshoku Co., Ltd., TC-H3DPK) at 20° C. The obtained haze was evaluated based on the following criteria. In addition, the change in haze was calculated based on the difference from the haze measured in "(6) visibility".

○ (Good): Haze was less than 3.5% and change in haze was less than 20%.

× (Poor): Haze was 3.5% or more, or change in haze was 20% or more.

TABLE 2

| | Evaluation | | | | | | | |
|---|---|---|---|---|---|---|---|---|
| | Alkali metal content | | | Tensile strength | | Water solubility | | Long-term |
| | Sodium (wt %) | Potassium or lithium (wt %) | Content per unit area (g/m$^2$) | Tensile strength (MPa) | Evaluation | Dissolution time (sec.) | Evaluation | storability Evaluation of appearance |
| Example 1 | 0.85 | 0 | 0.51 | 14.7 | ○○ | 23 | ○ | ○ |
| Example 2 | 2.1 | 0 | 1.26 | 13.2 | ○○ | 19 | ○○ | ○ |
| Example 3 | 3.2 | 0 | 1.92 | 12.8 | ○○ | 16 | ○○ | ○ |
| Example 4 | 1.6 | 0 | 0.96 | 10.5 | ○○ | 18 | ○○ | ○ |
| Example 5 | 4.1 | 0 | 2.46 | 22 | ○ | 14 | ○○ | ○ |
| Example 6 | 0.5 | 0 | 0.30 | 8.3 | ○○ | 27 | ○ | ○ |
| Example 7 | 1.5 | 0 | 0.90 | 10 | ○○ | 13 | ○○ | ○ |
| Example 8 | 1.3 | 0 | 0.78 | 6.5 | ○○ | 14 | ○○ | ○ |
| Example 9 | 0.9 | 0 | 0.54 | 15 | ○○ | 21 | ○ | ○ |
| Example 10 | 0.9 | 0 | 0.54 | 16 | ○○ | 16 | ○○ | ○ |
| Example 11 | 0 | 1.2 | 0.72 | 9.3 | ○○ | 22 | ○ | ○ |
| Example 12 | 0 | 3 | 1.80 | 13 | ○○ | 18 | ○○ | ○ |
| Comparative Example 1 | 0.2 | 0 | 0.12 | 15 | ○ | 31 | x | ○ |
| Comparative Example 2 | 0.1 | 0 | 0.06 | 3 | x | 28 | ○ | x |
| Comparative Example 3 | 6.5 | 0 | 3.90 | 20 | ○ | 14 | ○○ | x |
| Comparative Example 4 | 0.25 | 0 | 0.15 | 14.6 | ○ | 32 | x | ○ |

| | Evaluation | | | | | | |
|---|---|---|---|---|---|---|---|
| | | | | | Visibility after durability test | | |
| | | | Visibility | | | Change | |
| | Chemical resistance | | Haze | | Haze | in haze | |
| | Appearance | Evaluation | (%) | Evaluation | (%) | (%) | Evaluation |
| Example 1 | Colored brown | x | 2.3 | ○ | 3.3 | 43.5 | x |
| Example 2 | Colored brown | x | 2.8 | ○ | 4 | 42.9 | x |
| Example 3 | Colored brown | x | 3.4 | ○ | 5 | 47.1 | x |
| Example 4 | No change | ○ | 2.2 | ○ | 2.3 | 4.5 | ○ |
| Example 5 | No change | ○ | 2.8 | ○ | 3 | 7.1 | ○ |
| Example 6 | No change | ○ | 2.4 | ○ | 2.6 | 8.3 | ○ |
| Example 7 | No change | ○ | 2.5 | ○ | 2.6 | 4.0 | ○ |
| Example 8 | No change | ○ | 3 | ○ | 3.1 | 3.3 | ○ |
| Example 9 | No change | ○ | 2.8 | ○ | 3 | 7.1 | ○ |
| Example 10 | No change | ○ | 2.3 | ○ | 2.7 | 17.4 | ○ |
| Example 11 | No change | ○ | 2.5 | ○ | 2.7 | 8.0 | ○ |
| Example 12 | No change | ○ | 3 | ○ | 3.3 | 10.0 | ○ |
| Comparative Example 1 | Colored brown | x | 2.1 | ○ | 3.5 | 66.7 | x |
| Comparative Example 2 | Colored brown | x | 2.3 | ○ | 3.9 | 69.6 | x |
| Comparative Example 3 | Colored brown | x | 3.6 | x | 6.2 | 72.2 | x |
| Comparative Example 4 | Colored brown | x | 2.2 | ○ | 3.7 | 68.2 | x |

INDUSTRIAL APPLICABILITY

The present invention can provide a water-soluble packaging film which is capable of packaging chemicals while maintaining appropriate flexibility without changes in the appearance or offensive odors over a long period of time, which takes much less time to dissolve in water, and which can achieve excellent water solubility, excellent visibility, and excellent chemical resistance.

The invention claimed is:

1. A water-soluble packaging film comprising:

polyvinyl alcohol;

a plasticizer; and an alkali metal, wherein the water-soluble packaging film contains 3 to 15 parts by weight of the plasticizer based on 100 parts by weight of the polyvinyl alcohol, wherein the water-soluble packaging film contains 0.3 to 5% by weight of the alkali metal and 83.8 to 97% by weight of the polyvinyl alcohol based on 100% by weight of the water-soluble packaging film, wherein the polyvinyl alcohol has a saponification degree of 80.0 to 99.9 mol %, and wherein a content of the alkali metal per unit area is 0.06 to 10 g/m$^2$.

2. The water-soluble packaging film according to claim 1, wherein the alkali metal is sodium.

3. The water-soluble packaging film according to claim 1, wherein the polyvinyl alcohol has a standard deviation (σ) of saponification degree distribution of 0.1 to 1.0 mol %.

4. The water-soluble packaging film according to claim 1, wherein the water-soluble packaging film has a tensile strength in a tensile test at an elongation of 100% of 5 to 30 MPa.

5. The water-soluble packaging film according to claim 1, wherein the polyvinyl alcohol is modified with at least one hydrophilic group selected from the group consisting of a sulfonic acid group, a pyrrolidone ring group, an amino group, and a carboxyl group.

6. The water-soluble packaging film according to claim 5, wherein the polyvinyl alcohol contains a constitutional unit having the hydrophilic group in an amount of 0.1 to 15 mol %.

* * * * *

US009868574C1

(12) EX PARTE REEXAMINATION CERTIFICATE (11678th)

United States Patent

Ieda et al.

(10) Number: US 9,868,574 C1

(45) Certificate Issued: May 13, 2020

(54) WATER-SOLUBLE PACKAGING FILM

(71) Applicant: SEKISUI CHEMICAL CO., LTD., Osaka (JP)

(72) Inventors: Yasuyuki Ieda, Aichi (JP); Shintaro Moriguchi, Shiga (JP)

(73) Assignee: SEKISUI CHEMICAL CO., LTD., Kita-Ku, Osaka-Shi, Osaka (JP)

Reexamination Request:
No. 90/014,312, Jun. 7, 2019

Reexamination Certificate for:

| | |
|---|---|
| Patent No.: | **9,868,574** |
| Issued: | **Jan. 16, 2018** |
| Appl. No.: | **15/506,816** |
| PCT Filed: | **Aug. 27, 2015** |
| PCT No.: | **PCT/JP2015/074218** |
| § 371 (c)(1), (2) Date: | **Feb. 27, 2017** |
| PCT Pub. No.: | **WO2016/035671** |
| PCT Pub. Date: | **Mar. 10, 2016** |

(30) Foreign Application Priority Data

Sep. 1, 2014 (JP) ................................ 2014-177522
Feb. 20, 2015 (JP) ................................ 2015-032186

(51) Int. Cl.

| | |
|---|---|
| ***B65D 65/46*** | (2006.01) |
| ***C08K 3/10*** | (2018.01) |
| ***C08K 5/053*** | (2006.01) |
| ***C08J 5/18*** | (2006.01) |
| ***B65D 65/02*** | (2006.01) |
| ***C08K 3/08*** | (2006.01) |
| ***C08L 29/04*** | (2006.01) |

(52) U.S. Cl.
CPC ............ *B65D 65/46* (2013.01); *B65D 65/02* (2013.01); *C08J 5/18* (2013.01); *C08K 3/08* (2013.01); *C08K 3/10* (2013.01); *C08K 5/053* (2013.01); *C08L 29/04* (2013.01); *C08J 2329/04* (2013.01)

(58) Field of Classification Search
None
See application file for complete search history.

(56) References Cited

To view the complete listing of prior art documents cited during the proceeding for Reexamination Control Number 90/014,312, please refer to the USPTO's public Patent Application Information Retrieval (PAIR) system under the Display References tab.

*Primary Examiner* — Timothy J. Kugel

(57) ABSTRACT

The present invention provides a water-soluble packaging film which is capable of packaging chemicals while maintaining appropriate flexibility without changes in the appearance or offensive odors over a long period of time, which takes much less time to dissolve in water, and which can achieve excellent water solubility, excellent visibility, and excellent chemical resistance. The present invention relates to a water-soluble packaging film containing: polyvinyl alcohol; a plasticizer; and an alkali metal, the water-soluble packaging film containing 3 to 15 parts by weight of the plasticizer based on 100 parts by weight of the polyvinyl alcohol, the water-soluble packaging film containing 0.3 to 5% by weight of the alkali metal based on 100% by weight of the water-soluble packaging film.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 5 is cancelled.

Claims 1 and 6 are determined to be patentable as amended.

Claims 2-4, dependent on an amended claim, are determined to be patentable.

New claims 7-9 are added and determined to be patentable.

1. A water-soluble packaging film comprising:

polyvinyl alcohol;

a plasticizer; and an alkali metal, wherein the water-soluble packaging film contains 3 to [15] *13* parts by weight of the plasticizer based on 100 parts by weight of the polyvinyl alcohol, wherein the water-soluble packaging film contains 0.3 to 5% by weight of the alkali metal and 83.8 to 97% by weight of the polyvinyl alcohol based on 100% by weight of the water-soluble packaging film, wherein the polyvinyl alcohol has a saponification degree of 80.0 to 99.9 mol %, [and]

wherein a content of the alkali metal per unit area is 0.06 to 10 g/m$^2$, *and*

*wherein the polyvinyl alcohol is modified with a sulfonic acid group and the polyvinyl alcohol is not modified with a carboxyl group.*

6. The water-soluble packaging film according to claim [5] *1*, wherein the polyvinyl alcohol contains a constitutional unit having the [hydrophilic] *sulfonic acid* group in an amount of 0.1 to 15 mol %.

*7. The water-soluble packaging film according to claim 1,*

*wherein the sulfonic acid group is bonded to a polymer main chain through a linking group.*

*8. The water-soluble packaging film according to claim 1,*

*wherein the polyvinyl alcohol has a polymerization degree of 900 to 2000.*

*9. The water-soluble packaging film according to claim 1,*

*wherein the polyvinyl alcohol does not have an N-vinyl-amide monomer unit.*

* * * * *